(12) United States Patent
Roling et al.

(10) Patent No.: US 10,493,572 B2
(45) Date of Patent: Dec. 3, 2019

(54) WELDING FERRIS WHEEL POSITIONER

(71) Applicant: Lincoln Global, Inc., City of Industry, CA (US)

(72) Inventors: Adam Roling, Preston, IA (US); Brad J. Goddard, Rock Island, IL (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 203 days.

(21) Appl. No.: 15/432,085

(22) Filed: Feb. 14, 2017

(65) Prior Publication Data
US 2017/0355045 A1 Dec. 14, 2017

Related U.S. Application Data

(60) Provisional application No. 62/349,957, filed on Jun. 14, 2016.

(51) Int. Cl.
*B23K 37/047* (2006.01)
*B23K 37/04* (2006.01)

(52) U.S. Cl.
CPC ........ *B23K 37/047* (2013.01); *B23K 37/0452* (2013.01)

(58) Field of Classification Search
CPC .. B23K 37/047; B23K 37/0452; B23K 37/02; B23K 37/04; B23K 37/0408; B23K 37/0435; B23K 37/0461; B23K 37/0538; Y10T 409/305842; Y10T 29/49998; Y10T 408/5614; Y10T 409/30896; Y10T 29/5129; Y10T 29/513; Y10T 409/305656;

(Continued)

(56) References Cited

U.S. PATENT DOCUMENTS

| | | | |
|---|---|---|---|
| 3,457,899 A * | 7/1969 | Kelch | H02K 15/12 118/503 |
| 4,852,748 A | 8/1989 | Burgess | |
| 5,658,476 A | 8/1997 | Gullo | |

(Continued)

FOREIGN PATENT DOCUMENTS

| CN | 202539885 U | 11/2012 |
|---|---|---|
| CN | 202752787 U | 2/2013 |

(Continued)

OTHER PUBLICATIONS

"Positioners for Challenging Parts"—Yaskawa America, Inc, (www.motoman.com/positioners/multiaxis-positioners) accessed on Jul. 4, 2016—2 pages.

(Continued)

*Primary Examiner* — Monica S Carter
*Assistant Examiner* — Abbie E Quann

(57) ABSTRACT

A five axis welding positioner has a horizontally oriented indexing axis for indexing a welding part between workstations. The indexing axis corresponds to a first axis of rotation. Each workstation has a "C" shaped frame for holding a welding part and may be tilted about a tilting axis. The tilting axes of each workstation correspond to second and third axes of rotation. Each "C" shaped frame has a head stock and tail stock that can rotate the welding part about a rotation axis. The rotation axes correspond to fourth and fifth axes of rotation. Movement about each axis can be effectuated by an actuator such as a motor.

17 Claims, 6 Drawing Sheets

(58) Field of Classification Search
CPC ........ B23Q 1/52; B23Q 1/5406; B23Q 1/525; B23Q 1/5437; B23Q 39/028; Y10S 269/90
USPC ........... 269/58, 71, 57, 55; 408/89; 409/168, 409/165, 224
See application file for complete search history.

(56) References Cited

U.S. PATENT DOCUMENTS

| | | | |
|---|---|---|---|
| 5,873,569 A | | 2/1999 | Boyd |
| 6,036,082 A | | 3/2000 | Caldarone |
| 6,147,323 A | | 11/2000 | Erickson |
| 6,264,418 B1 | | 7/2001 | Michael et al. |
| 6,281,474 B1 | | 8/2001 | Michael et al. |
| 6,347,733 B1 | | 2/2002 | Hickey |
| 6,375,178 B1 | | 4/2002 | Schilb |
| 6,450,490 B1 | | 9/2002 | Mangelsen et al. |
| 6,921,011 B1 | | 7/2005 | Mangelsen et al. |
| 7,172,376 B1 | | 2/2007 | Jagtap et al. |
| 7,434,491 B1 | | 10/2008 | Sutton |
| 7,837,084 B2 | | 11/2010 | Simmons |
| 8,056,796 B2 | | 11/2011 | Simmons |
| 8,113,415 B2 | | 2/2012 | Paquette |
| 8,146,901 B2 | | 4/2012 | Mangelsen |
| 8,338,751 B2 | | 12/2012 | Larkins |
| 2005/0139036 A1* | | 6/2005 | Kato ............... B23Q 1/287 74/813 L |
| 2006/0226139 A1 | | 10/2006 | Jennings |
| 2006/0242818 A1 | | 11/2006 | Penick |
| 2014/0015181 A1* | | 1/2014 | Murphy ............ B23K 37/04 269/9 |
| 2016/0129535 A1 | | 5/2016 | Mabee |

FOREIGN PATENT DOCUMENTS

| | | |
|---|---|---|
| CN | 202951975 U | 5/2013 |
| CN | 204123012 U | 1/2015 |

OTHER PUBLICATIONS

"OTC-Daihen Ferris Wheel Positioner"—Mac-Tech/OTC Daihen (www.mac-tech.com/product/otc-daihen-ferris-wheel-positioner) 2015—3 pages.

"Happy (W)ending for Long Components"—OTC Daihen Europe GmbH (www.otc-daihen.de/index.php?d=937&lang=002) accessed on Jul. 4, 2016—2 pages.

"COMAU Robotics Motorized Positioner"—Virtual Expo Group/ COMAU Robotics (www.directindustry.com/prod/comau-robotics/ product-15481-1776004.html) accessed on Jul. 4, 2016—10 pages.

"RM2 (TM)-Series 2-Station Positioner"—Yaskawa Europe GmbH (www.yaskawa.eu.com/en/products/robotic/peripherals/positioners/ productdetail/product/rm2-tn/) accessed Jul. 4, 2016—2 pages.

Pages 238-239 of "MIG Welding Guide"—The Institute of Materials, Minerals & Mining, Edited by Klas Weman and Gunnar Linden (acesrobotics.com/tri-arc-1000-ferris-wheel-positioner/) 2006—319 pages.

"Examining Auxiliary Axes: Auxiliary Axis Components Allow for Increased Access When Using Robotics to Weld Parts"—Machining News/CNCMedia (www.machiningnews.com/2016/02/examining-auxiliary-axes/) Feb. 2, 2016—4 pages.

"Engineered Workholding Solutions"—Alliance Communications, Inc. (www.fabricatingandmetalworking.com/2014/04/engineered-workholding-solutions/4/) Apr. 28, 2014—7 pages.

"RM2 TN One-Axis Positioner, 2-Station"—Motoman Robotics Europe AB (www.yaskawa.eu.com/index.php?eID=dumpFile&t=f &f=630&token=e2325c21b691597d029216a3fe44417d9298e84f) Sep. 2007—2 pages.

* cited by examiner

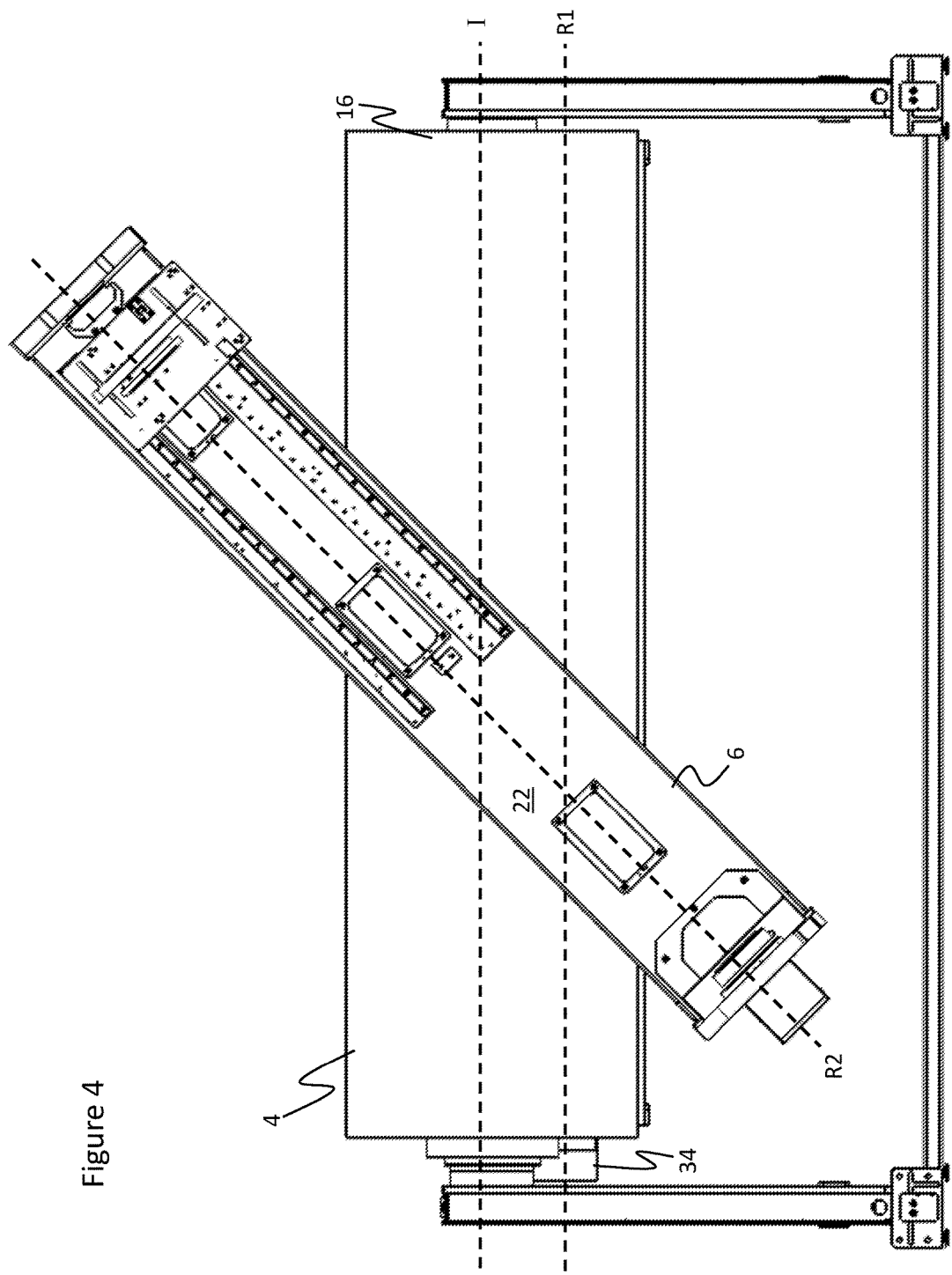

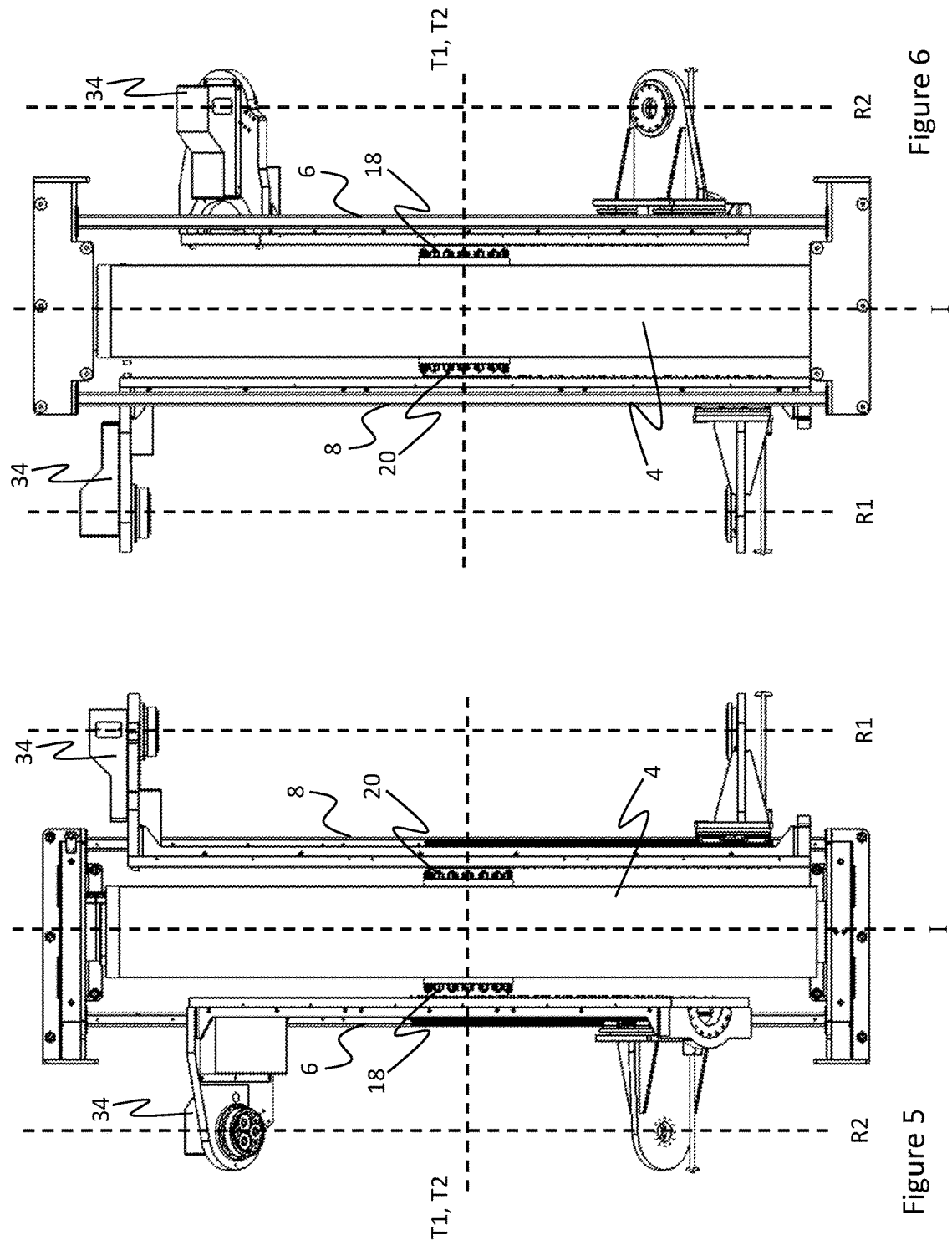

WELDING FERRIS WHEEL POSITIONER

CROSS REFERENCE TO RELATED APPLICATIONS

This application claims priority to U.S. Provisional Application Ser. No. 62/349,957, filed on Jun. 14, 2016, entitled "SKYGIMBAL FERRIS WHEEL POSITIONER", the entirety of which is incorporated herein by reference.

BACKGROUND

Welding positioners, also referred to as indexing skygimbals, hold and position objects for welding processes (often welding by a robotic welder). One side of the positioner (a front face) is exposed to the welder while another side (a back face) is exposed to a user. In this configuration, a user can remove a welded object from the positioner's back face and replace it with an object(s) to be welded during the process while another object(s) on the front face undergoes the welding process. Following the welding process, the positioner indexes the objects from one position to another (e.g., front to back). However, current positioners index about a vertical rotation axis, resulting in the welding positioners occupying a large factory floor space. Current positioners are also limited by their number of axes of rotation.

BRIEF SUMMARY OF THE INVENTION

According to one example of the following disclosure a welding positioner comprises a main frame; a tilting support mounted horizontally between two side walls of the main frame along an indexing axis, the tilting support being rotatable about the indexing axis; and at least two "C" shaped frames mounted on different faces of the tilting support, each of the "C" shaped frames having a headstock and a tailstock for holding a workpiece, wherein the "C" shaped frames are rotatable about tilting axes, the tilting axes extending through respective mounting points on the tilting support, wherein the tilting axes do not intersect each other, and wherein the welding positioner has at least five axes of rotation.

In various embodiments of the above example, workpieces mounted between the headstocks and the tailstocks of the "C" shaped frames are rotatable about rotating axes extending through the headstocks and the tailstocks; the welding positioner further comprises at least one actuator that rotates the tilting support, the at least two "C" shaped frames, and the workpiece about the indexing axis, the tilting axes, and the rotating axis, respectively; the actuator is automated to rotate a workpiece about the tilting and rotating axes in accordance with a welding process performed by a robotic welder on the workpiece; the headstocks or the tailstocks of the "C" shaped frames are movable so as to change a distance between the headstocks and tailstocks; and/or at least one tilting axis does not intersect the indexing axis.

According to another example, a welding positioner comprises a main frame; a tilting support mounted horizontally between two side walls of the main frame along an indexing axis; and at least two "C" shaped frames mounted on different faces of the tilting support, each of the "C" shaped frames having a headstock and a tailstock for holding a workpiece, wherein the tilting support is rotatable about the indexing axis, wherein the "C" shaped frames are rotatable about tilting axes extending through respective mounting points on the tilting support, wherein a workpiece held by one of the "C" shaped frames is rotatable about a rotating axis extending through the headstock and the tailstock of the one of the "C" shaped frames.

In various embodiments of the above example, the tilting axes do not intersect each other; at least one tilting axis does not intersect the indexing axis; the welding positioner further comprises at least one actuator that rotates the tilting support, the at least two "C" shaped frames, and the workpiece about the indexing axis, the tilting axes, and the rotating axis, respectively; the actuator is automated to rotate a workpiece about the tilting and rotating axes in accordance with a welding process performed by a robotic welder on the workpiece; the headstocks or the tailstocks of the "C" shaped frames are movable so as to change a distance between the headstocks and tailstocks.

According to another example, a welding positioner comprises a main frame; a tilting support mounted horizontally between two side walls of the main frame along an indexing axis, the tilting support being rotatable about the indexing axis; and at least two "C" shaped frames mounted on different faces of the tilting support, each of the "C" shaped frames having a headstock and a tailstock for holding a workpiece, wherein the "C" shaped frames are rotatable about respective tilting axes, the tilting axes extending through respective mounting points on the tilting support, wherein the tilting axes are parallel, and the tilting axes are rotatable with the tilting support and around the indexing axis, and wherein the welding positioner has at least five axes of rotation.

In various embodiments of the above example, the tilting axes do not intersect the indexing axis; workpieces mounted between the headstocks and the tailstocks of the "C" shaped frames are rotatable about rotating axes extending through the headstocks and the tailstocks; the tilting axes are perpendicular to the rotating axes; and/or the headstocks or the tailstocks of the "C" shaped frames are movable along the tilting support so as to change a distance between the headstocks and tailstocks.

BRIEF DESCRIPTION OF THE DRAWINGS

FIG. 4 illustrates a back view of the example embodiment;

FIG. 5 illustrates a top view of the example embodiment;

FIG. 6 illustrates a bottom view of the example embodiment; and

DETAILED DESCRIPTION OF THE INVENTION

The present disclosure relates to a welding positioner, also referred to as an indexing skygimbal. More specifically, the present disclosure relates to a five axis positioner having a horizontally oriented indexing axis. The first axis is orientated horizontally and is used for indexing workstations of the welding positioner. The second and third axes allow tilting of a workpiece into position. The fourth and fifth axes provide part rotation.

Welding positioners described herein can comprise one or more workstations for performing welding operations on a workpiece(s). Each workstation can hold and move a workpiece to position it for a desired welding operation. Thus, multiple robots can be operable to perform welding operations on a workpiece at each workstation. Alternatively, welding operations may be performed at one workstation, while a workpiece is replaced at the other workstation. As a result of the structure described herein, the welding positioner is able to occupy a smaller area (e.g., floor space) than current welding positioners and provide more flexibility for object positioning.

Referring to FIGS. 1-7, a welding positioner has a main frame 2, a tilting support 4, and a "C" shaped frame 6, 8.

Figure 1:
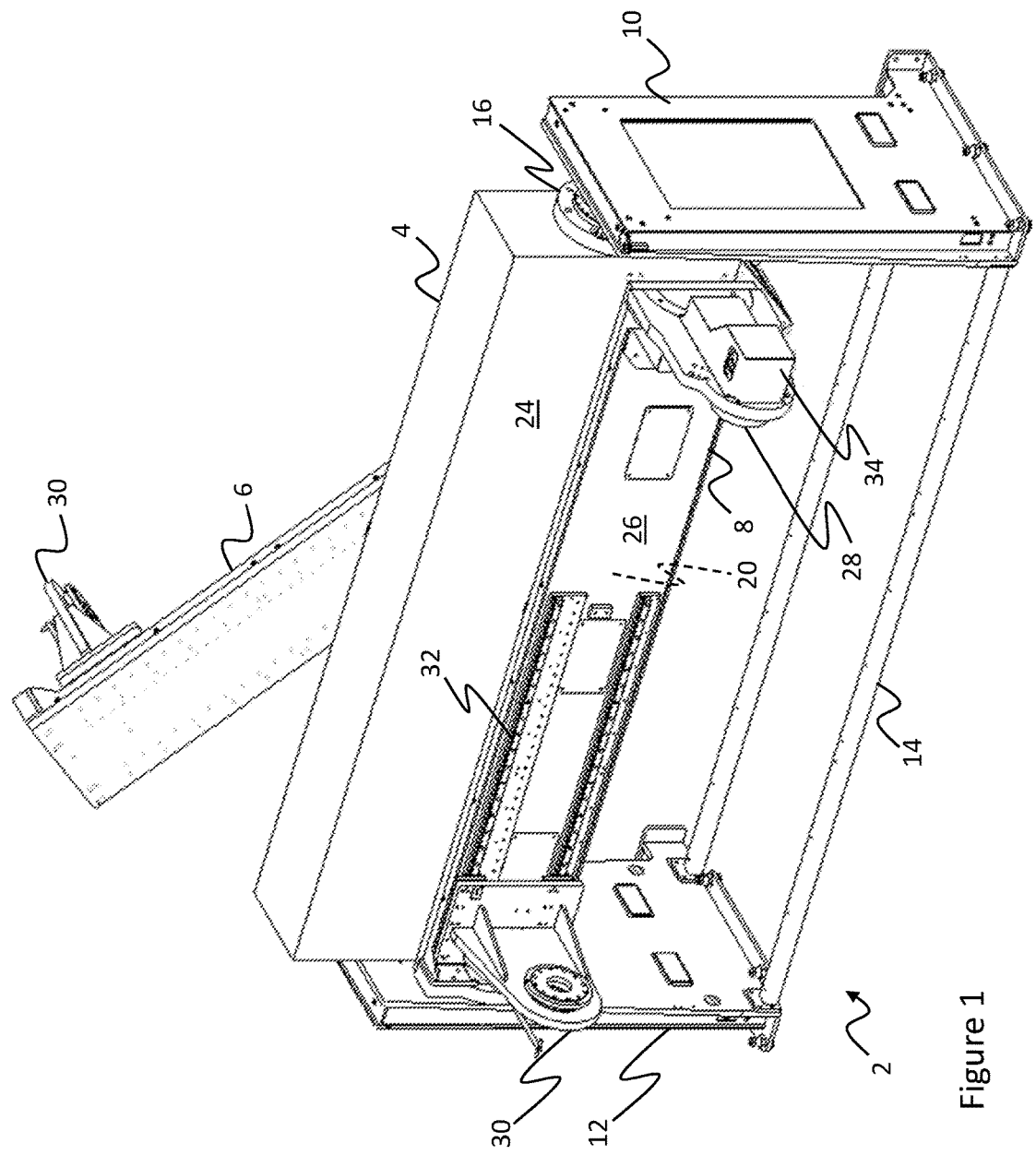
FIG. 1 illustrates a front perspective view of an example embodiment.
Figure 2:
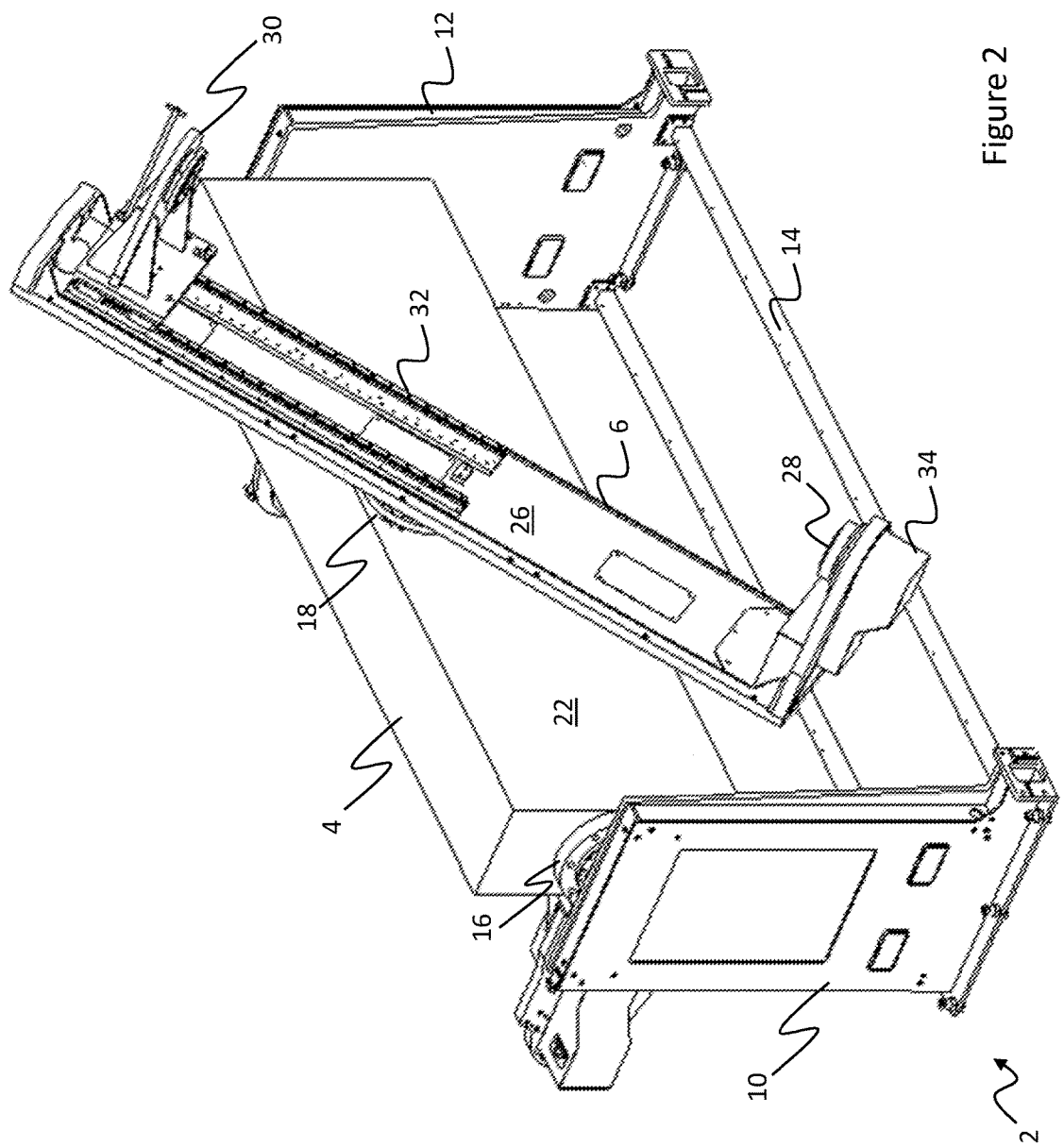
FIG. 2 illustrates a back perspective view of the example embodiment.

The main frame 2 comprises a first side 10, a second side 12, and a base 14. The first side 10 and second side 12 comprise a headstock and tailstock, respectively, on which the tilting support 4 is mounted. The first and second sides 10, 12 are supported and structurally stabilized by the base, which extends between the sides 10, 12. The base may be a single solid piece, or two cross members attached at opposite ends of the bottom of the sides 10, 12 as shown in FIGS. 1 and 2. In this manner, weight is distributed across the floor space of the positioner rather than only through the sides 10, 12. Further, the base reduces torsion of the positioner. The base 14 and/or main frame 2 may be bolted to a workspace floor to secure the positioner.

The first and second sides 10, 12 also comprise at least one actuator 16 for rotating the tilting support 4 about an indexing axis I. The actuator 16 may be, for example, a motor. The indexing axis I passes through the headstock and tailstock of the first and second sides 10, 12. Preferably, the indexing axis I runs parallel or substantially parallel to the base 14 of the main frame 2 and passes perpendicularly through the first and second sides 10, 12 of the main frame 2. In this manner, the indexing axis I is also parallel (horizontal) with respect to the floor upon which the welding positioner sits.

The tilting support 4 comprises actuators 18, 20 on opposing faces of the support 4. In other embodiments, an actuator may be disposed on other, non-opposing faces of the tilting support. The actuators 18, 20 may be, for example, motors. The actuators are vertically offset from a center of the face on which they are disposed. In other words, the actuator 18 on a first face 22 is located near the top of the face 22 while the actuator 20 on a second face 24 is located near the bottom of the face 24. This offset allows for an ergonomic loading height on the load side while allowing the needed height when indexed to tilt the part into position for welding. In other embodiments, the actuators may be horizontally offset from center.

The main frame 2 may also have a cross support between the first side 10 and second side 12 to provide further support for the frame 2 and positioner. Such a support may serve as a shaft supporting tilting support 4 and helping rotation of the tilting support, similar to an axle. In this way, the weight of the positioner and welding objects are more evenly distributed across the frame 2 as a whole, rather than at connection points of the tilting support 4 and first and second sides 10, 12. Moreover, if the tilting support 4 is operatively connected to the shaft/cross support, the rotating force generated by the actuator 16 may be distributed across the length of the shaft and tilting support 4, rather than at the connection points. The shaft may be permanently connected to the tilting support 4, for example, by welding, or may be connected via gears or similar interlocking teeth, tongue and grooves, or the like. The shaft may be connected to an operative portion of the actuator through gearing, a permanent connection to an output shaft of the actuator, or other similar known means. In these configurations, the indexing axis I extends through the shaft or other cross support.

The tilting support 4 may be attached to sides 10, 12 with a bearing at one end and a driven gear at the other end. The driven gear may be driven by actuator 16. The actuator and gear may be recessed within side 10, or exposed externally.

A "C" shaped frame 6, 8 is attached to each of the actuators 18, 20 disposed on the tilting support 4. Preferably, the "C" shaped frames 6, 8 are attached at their centers such that they may be rotated about a tilting axis T1, T2 through the actuators 18, 20 of the tilting support 4. The "C" shaped frames 18, 20 have a base 26 attached to the actuator of the tilting support 4, a headstock 28 extending from one end of the base 26, and a tailstock 30 extending from another end of the base 26. Similar to the tilting support 4, the actuators of the tilting support 4 to which the "C" shaped frames 6, 8 are attached may be recessed within the tilting support 4 or exposed externally.

The headstock 28 and/or tailstock 30 may be adjustable along the length of the base 26 in order to change the distance between the headstock 28 and tailstock 30. For example, the headstock 28 and/or tailstock 30 may be mounted on a track 32 provided on the base 26 of the "C" shaped frame 6, 8. The headstock 28 and/or tailstock 30 may then be adjusted along the length of the track 32 and locked at a desired position. Thus, the headstock 28 and tailstock 30 of the "C" shaped frame 6, 8 can hold a workpiece for welding operations. Each "C" shaped frame/tilting support face corresponds to a workstation of the welding positioner.

The headstock 28 and tailstock 30 of the "C" shaped frame 6, 8 also comprise at least one actuator 34. The actuator 34 may be, for example, a motor. The actuator 34 causes rotation of a workpiece held between the headstock 28 and the tailstock 30 about a rotation axis R1, R2. The rotation axis R1, R2 preferably passes perpendicularly through the headstock and tailstock of the "C" shaped frame 6, 8.

The indexing axis I corresponds to the first axis of rotation of the welding positioner. By rotating the tilting support about the indexing axis I, the welding positioner can expose the other workstation. The rotation of each of the two "C" shaped frames 6, 8 about the tilting axes corresponds to the second and third axes of rotation. Rotating the "C" shaped frames 6, 8 in this manner allows tilting of a workpiece into position for a welding operation or adjustment. The rotation axis R1, R2 of each "C" shaped frame 6, 8 corresponds to the fourth and fifth axes of rotation and allows rotational adjustment of the workpiece held in each "C" shaped frame 6, 8.

Figure 3:
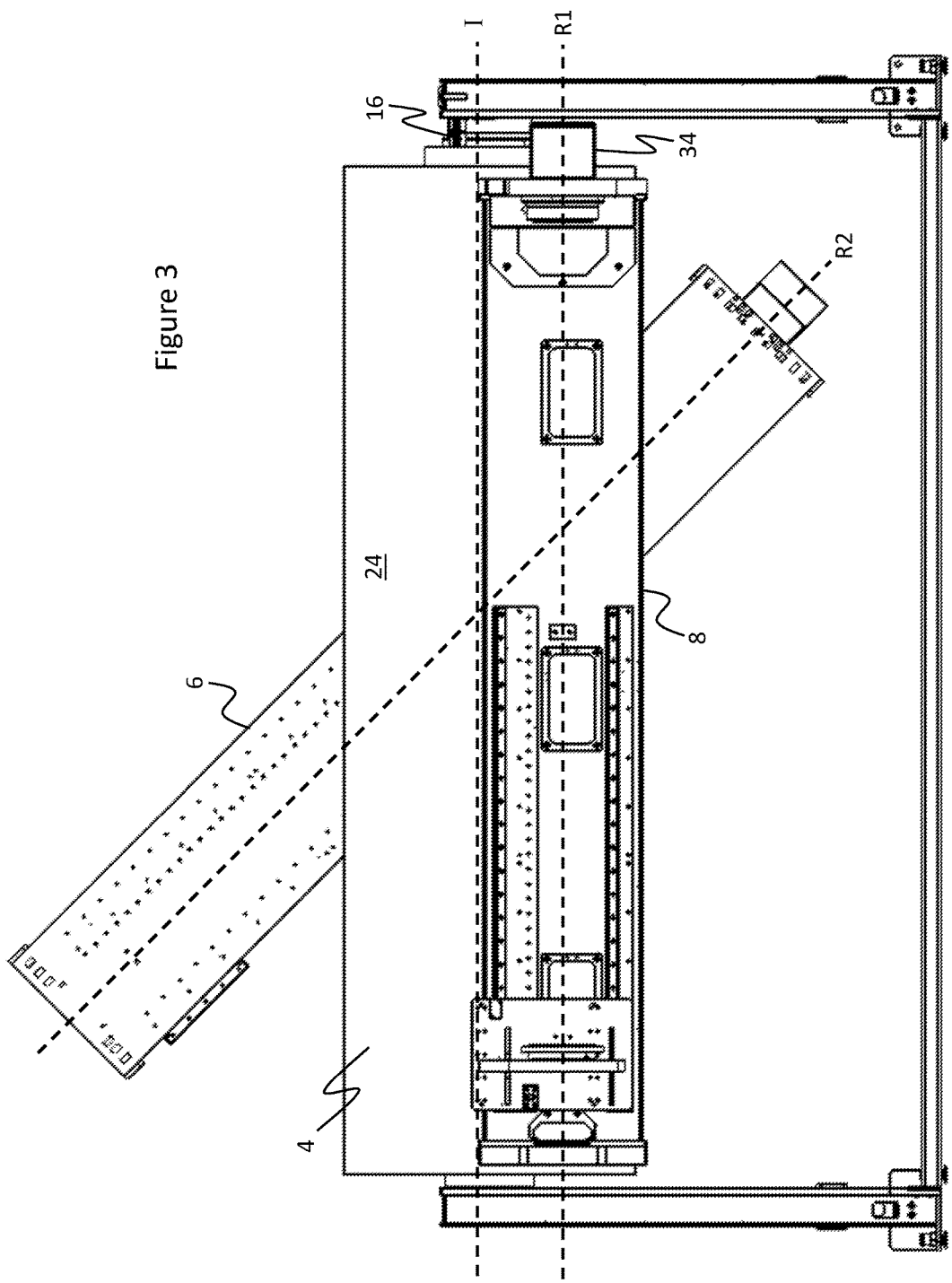
FIG. 3 illustrates a front view of the example embodiment.

Each of the five axes of rotation is illustrated with specific regard to FIGS. 3-7. FIGS. 3 and 4 illustrate front and back views of the positioner, respectively. As can be seen in these figures, the indexing axis I extends through the tilting support 4 and is parallel to the bottom of the positioner. The rotating axes of the "C" shaped frames 6, 8 extend through the respective head and tail stocks. When the "C" shaped frame 8 is horizontal on the tilting support 4, the rotating axis R1 is parallel with the indexing axis I. As shown in FIG. 3, the rotating axis R1 is located at a lower vertical elevation than the indexing axis I, which runs through the middle of the tilting support 4. In this manner, the "C" shaped frame 8 is mounted on a bottom half of the tilting support 4. In this position, the "C" shaped frame 8 is at a loading workstation whereby the lower position makes it easier to load a new object onto the "C" shaped frame 8. FIG. 4 illustrates a welding workstation of the tilting support 4 and shows "C" shaped frame 6 mounted in the upper half of the tilting support 4. As noted above, the "C" shaped frames may be mounted at any location on the tilting support 4. As shown in FIG. 4, the "C" shaped frame 6 has been tilted about the titling axis T2 to a 45 degree angle. Again, the rotating axis R2 of the "C" shaped frame 6 extends through the headstock and tailstock of "C" shaped frame. As such, rotating axis R2 crosses the indexing axis I at a 45 degree angle.

Regarding FIGS. 5 and 6, the indexing axis I is again shown running through the middle of the tilting support 4 and first and second sides 10, 12 of the main frame 2. The rotating axes R1, R2 are also illustrated as extending through the headstocks and tailstocks 28, 30 of "C" shaped frames 6, 8. Tilting axes T1, T2 extend perpendicularly through the tilting support 4. In the embodiment illustrated in FIGS. 5 and 6, the tilting axes T1, T2 are in the same plane; however, as noted above, the tilting axes T1, T2 may be offset from the center of tilting support 4.

Figure 7:
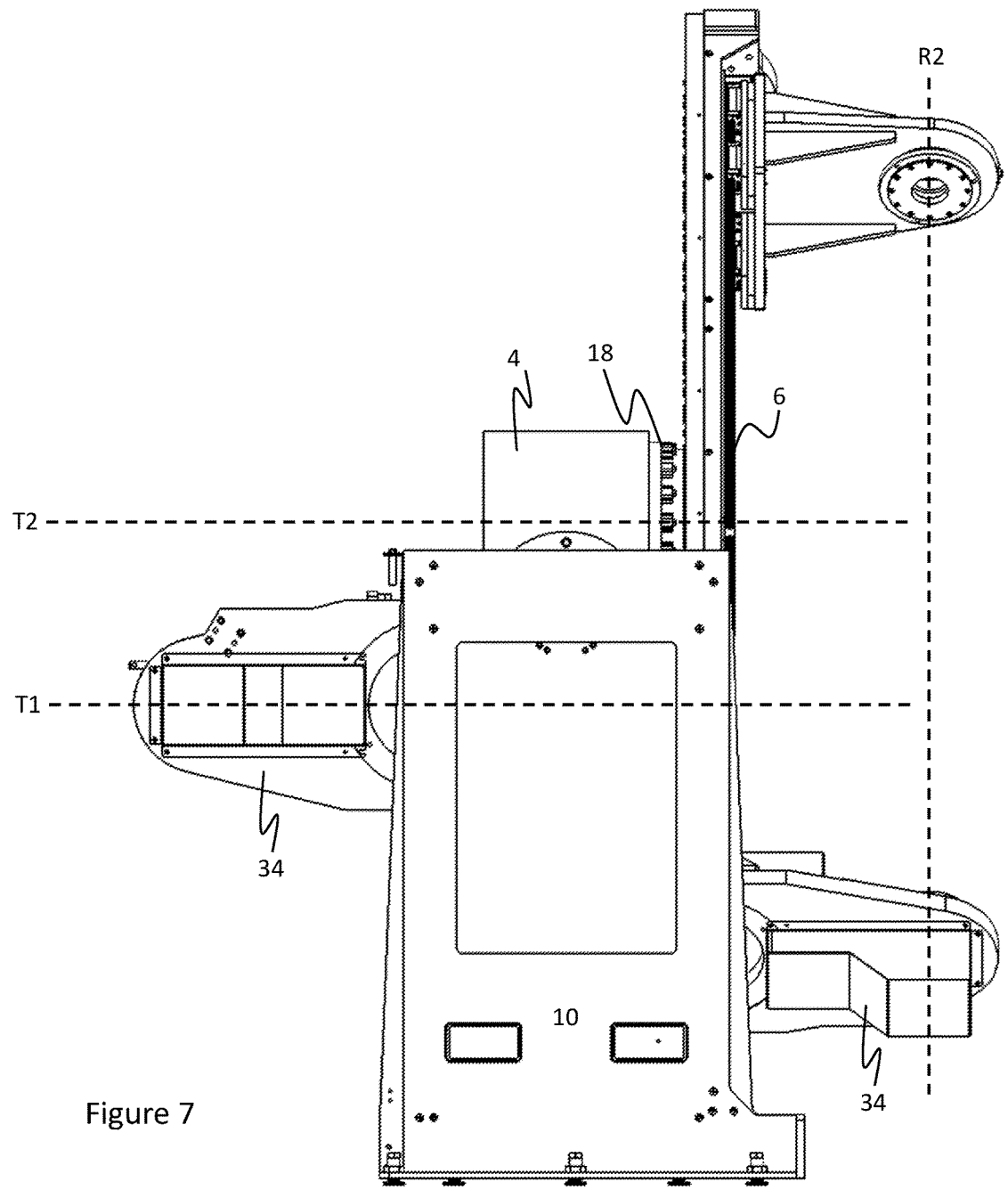
FIG. 7 illustrates a side view of the example embodiment.

FIG. 7 illustrates a side view of the positioner and, particularly, the relative positions of tilting axes T1, T2. As shown in the figure, "C" shaped frame 6 is mounted higher on the tilting support 4 at a welding workstation than "C" shaped frame 8 at the loading workstation. As such, tilting axis T1 of the "C" shaped frame 8 of the loading workstation is lower than tilting axis T2 of the "C" shaped frame 6 of the welding workstation. From the vantage point of FIG. 7, the indexing axis (not shown) extends into and out of the figure through tilting support 4 between tilting axes T1, T2. In this manner, the tilting axes T1, T2 do not intersect the indexing axis I.

As described above, the actuators controlling each axis of rotation may be motors. For example, the motors may be traditional AC or DC electric motors, stepper motors, servo motors, or the like, and may have gearbox drive mechanisms, gear reducers, and the like. In other embodiments, the actuators may be hydraulic, pneumatic, mechanical (e.g., hand powered), or any other device capable of effecting rotational motion about the axes. Rotation about each of the axes may also be locked in place to secure rotation about a certain position. For example, the tilting support 4 need not always be positioned in a vertical manner as illustrated in FIGS. 1 and 2. Rather, it may be desirable to lock the tilting support 4 at a 45 degree angle to better perform a welding procedure on one of the workstations. Similarly, the "C" shaped frames 6, 8 and headstock/tailstocks 28, 30 may be locked at any angle about the tilting and rotation axes to properly orient a welding object for a welding procedure. The locking mechanisms for each actuator may be built into the actuators (e.g., as in a stepper motor) or may be independent of the motor. For example, the locking mechanism may be a pull pin, hand crank, rack and pinion combination, clamp, screw, bolt, and the like. It is further noted that each actuator and locking mechanism may be of a different type.

The actuators may be electronically controlled remotely or at the positioner. For example, control of the actuators may be automated to work in conjunction with robotic welders and/or robotic loaders in order to index and rotate a workpiece in accordance with a current welding process. The positioner and/or welding process may be controlled by a controller(s) or processor(s), the logic being stored in memory (such as RAM, ROM, Flash, hard disks, optical disks, and the like) of the controller(s) and/or processor(s), or as separate elements. These controller(s) and/or processor(s) also may be embedded or integrated with other controllers or processors designed for a separate purpose, for example, as part of a central processing unit (CPU). Such a processor or controller can be any, or part of any, electrical circuit comprised of any number of electrical components, including, for example, resistors, transistors, capacitors, inductors, and the like. The circuit may be of any form, including, for example, an integrated circuit, a set of integrated circuits, a microcontroller, a microprocessor, a collection of discrete electronic components on a printed circuit board (PCB) or the like.

While various features are presented above, it should be understood that the features may be used singly or in any combination thereof. Further, it should be understood that variations and modifications may occur to those skilled in the art to which the claimed examples pertain.

What we claim is:

1. A welding positioner, comprising:
   a main frame;
   a tilting support mounted horizontally between two side walls of the main frame along an indexing axis, the tilting support being rotatable about the indexing axis; and
   at least two "C" shaped frames mounted on different faces of the tilting support, each of the "C" shaped frames having a headstock and a tailstock for holding a work piece,
   wherein the "C" shaped frames are rotatable about tilting axes, the tilting axes extending through the tilting support,
   wherein the tilting axes are offset from a center of the tilting support in opposite directions and do not intersect, and
   wherein the welding positioner has at least five axes of rotation.

2. The welding positioner of claim 1, wherein the work pieces mounted between the headstocks and the tailstocks of the "C" shaped frames are rotatable about rotating axes extending through the headstocks and the tailstocks.

3. The welding positioner of claim 2, further comprising at least one actuator that rotates the tilting support, the at least two "C" shaped frames, and the work piece about the indexing axis, the tilting axes, and the rotating axes, respectively.

4. The welding positioner of claim 3, wherein the at least one actuator is automated to rotate the work piece about the tilting and the rotating axes in accordance with a welding process performed by a robotic welder on the work piece.

5. The welding positioner of claim 1, wherein the headstocks or the tailstocks of the "C" shaped frames are movable so as to change a distance between the headstocks and the tailstocks.

6. The welding positioner of claim 1, wherein at least one of the tilting axes does not intersect the indexing axis.

7. A welding positioner, comprising:
   a main frame;
   a tilting support mounted horizontally between two side walls of the main frame along an indexing axis;
   at least two "C" shaped frames mounted on different faces of the tilting support, each of the "C" shaped frames having a headstock and a tailstock for holding a work piece,
   wherein the tilting support is rotatable about the indexing axis,
   wherein the "C" shaped frames are rotatable about tilting axes extending through the tilting support, where the tilting axes are offset from a center of the tilting support in opposite directions, and wherein the work piece held by one of the "C" shaped frames is rotatable about a rotating axis extending through the headstock and the tailstock of the one of the "C" shaped frames.

8. The welding positioner of claim 7, wherein the tilting axes do not intersect.

9. The welding positioner of claim 7, wherein at least one of the tilting axes does not intersect the indexing axis.

10. The welding positioner of claim 7, further comprising at least one actuator that rotates the tilting support, the at least two "C" shaped frames, and the work piece about the indexing axis, the tilting axes, and the rotating axis, respectively.

11. The welding positioner of claim 10, wherein the at least one actuator is automated to rotate the work piece about the tilting and the rotating axes in accordance with a welding process performed by a robotic welder on the work piece.

12. The welding positioner of claim 7, wherein the headstocks or the tailstocks of the "C" shaped frames are movable so as to change a distance between the headstocks and the tailstocks.

13. A welding positioner, comprising:
a main frame;
a tilting support mounted horizontally between two side walls of the main frame along an indexing axis, the tilting support being rotatable about the indexing axis; and
at least two "C" shaped frames mounted on different faces of the tilting support, each of the "C" shaped frames having a headstock and a tailstock for holding a work piece,
wherein the "C" shaped frames are rotatable about respective tilting axes, the tilting axes extending through the tilting support where the tilting axes are offset from a center of the tilting support in opposite directions,
wherein the tilting axes are parallel, and the tilting axes are rotatable with the tilting support and around the indexing axis, and
wherein the welding positioner has at least five axes of rotation.

14. The welding positioner of claim 13, wherein the tilting axes do not intersect the indexing axis.

15. The welding positioner of claim 13, wherein the work pieces mounted between the headstocks and the tailstocks of the "C" shaped frames are rotatable about rotating axes extending through the headstocks and the tailstocks.

16. The welding positioner of claim 15, wherein the tilting axes are perpendicular to the rotating axes.

17. The welding positioner of claim 16, wherein the headstocks or the tailstocks of the "C" shaped frames are movable so as to change a distance between the headstocks and the tailstocks.

* * * * *